United States Patent [19]

Prince et al.

[11] 4,303,206
[45] Dec. 1, 1981

[54] DEBONING METHOD AND APPARATUS

[75] Inventors: Jack A. Prince, Gainesville; L. Wayne Abernathy, Lula; L. Justin Caylor, Dalton, all of Ga.

[73] Assignee: Jack Prince, Inc., Gainesville, Ga.

[21] Appl. No.: 72,888

[22] Filed: Sep. 6, 1979

[51] Int. Cl.³ ............................................. B02C 23/16
[52] U.S. Cl. ....................................... 241/24; 241/74; 241/82.3; 241/260.1
[58] Field of Search ................. 241/24, 74, 82.3, 82.1, 241/89.2, 89.3, 246, 257 R, 258, 260.1

[56] References Cited

U.S. PATENT DOCUMENTS 1,691,210 11/1928 Scherbaum ...................... 241/257 R
4,042,176 8/1977 Beck et al. ............................ 241/24

Primary Examiner—Mark Rosenbaum
Attorney, Agent, or Firm—Patrick F. Henry

[57] ABSTRACT

A deboning apparatus of the sort which operates an auger means to separate bone and similar hard material from the meat of chickens, fish or other animals. The present machine is vertically oriented whereby the ground meat and bone product is ingested or introduced above and flows by the auger to a meat exit therebelow and then a bone exit below the meat exit. The electric drive motor is supported beneath the bottom support plate and there is a bottom radial bearing and a top combination radial and thrust bearing. Other components include a particular arrangement and a compression for adjusting internal pressure as well as a screen for separation of the bone and meat.

23 Claims, 3 Drawing Figures

DEBONING METHOD AND APPARATUS

BACKGROUND OF THE INVENTION

1. FIELD OF THE INVENTION

The field of the invention is solid material comminution or disintegration and particularly processes with classification or separation of material and apparatus utilizing an arcuate screen concentric with a rotary comminuting member.

2. BACKGROUND OF THE INVENTION

Deboning machines and apparatus are known in the art. Such machines are in use in both the fish industry and the poultry industry for separating hard substances such as bone and cartilage from the softer meat which remains after the usual stripping operations. The material is normally ground to a certain consistency and then pumped into the separating machine. U.S. Pat. No. 4,042,176 presents a horizontally disposed and oriented machine which utilizes a comminuting pressure auger and screen. It should be noted that this machine being horizontally oriented has some of the usual problems associated with the flow of materials in the horizontal direction and the wear on the machinery. The machine employs a number of bearing pillow blocks for fully supporting the auger and the other components. Such bearings and blocks are unnecessary in the present arrangement. Further, the auger support and pressure adjustments are different. In the present device there is a lower bearing retainer and a compression ring which is adjustable to the auger so that the spacing between the auger and the throat through which the bone passes may be properly adjusted. The present device operates differently from the machine described in U.S. Pat. No. 4,042,176 in that among other things product enters at the far end and is augered toward the power-source; thus, the thrust bearing is on the opposite end and cone-compression which creates torque is next to the power-source.

An object of this invention is to provide a vertically oriented deboning machine which moves the product from above to below and is driven by a vertically oriented auger from a motor supported on a bottom base plate.

Another object of this invention resides in the particular arrangement of the compression ring and its adjustment to the auger.

An additional object of this invention resides in the bearing arrangement employing a combination radial and thrust bearing at the top and a radial bearing at the bottom thereby eliminating such things as spaced pillow block bearings or bearing plates.

Unlike prior machines this machine utilizes the natural internal pressures to accomplish continuous, self-pumping exiting of both usable meat and bone residue.

An advantage of the present invention resides in the vertical orientation requiring less floor space and also in the aforementioned arrangement of bearings and auger and other components whereby the machine is readily disassembled off of a bottom support and placed back thereon so that it may be broken down at the end of each work day and cleaned properly as required by various regulations.

Another advantage of the present invention is that the auger is hollow and therefore light and easy to handle and thus less likely to be dropped and damaged. Also this auger has female threads whereas earlier augers all have male threads and oftimes are constructed from more than a single piece.

Another advantage is that the hollow auger is threaded directly to the motor shaft via the stainless steel motor shaft adapter. Other deboners are actually attached to the motor shaft by way of a flexible rubber coupling. The present direct connection to the heavy motor rotor causes the rotor's weight to beneficially counter the upward thrust of the auger. This tends to lengthen the life of the thrust bearing.

SUMMARY OF THE INVENTION

The present invention is a vertically oriented deboning machine which employs a vertically oriented hollow auger confined in a housing and an adjustable compression ring mounted upon a bottom support. Deboning is accomplished by gradual pressurization on the confined food product to force the softer material through a screen and to drive the heavier solids through a confined passageway and a throat which is adjustable by means of the compression ring mounted on the base.

Other and further objects and advantages of this invention will become apparent upon reading the following description of a preferred embodiment taken in conjunction with the accompanying drawings.

DESCRIPTION OF A PREFERRED EMBODIMENT

Figure 1:
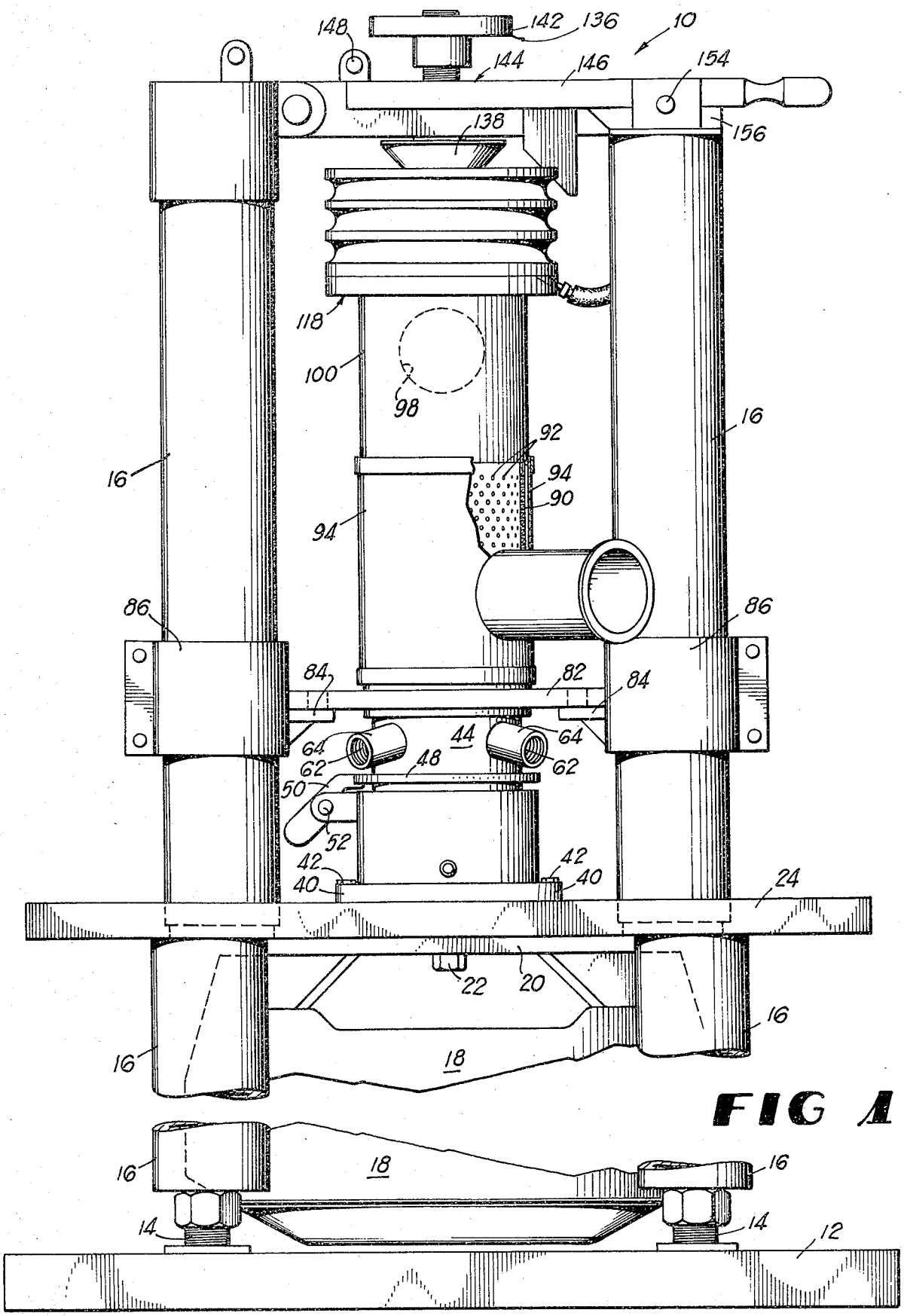
FIG. 1 is an elevation view of the machine in the present invention.
Figure 2:
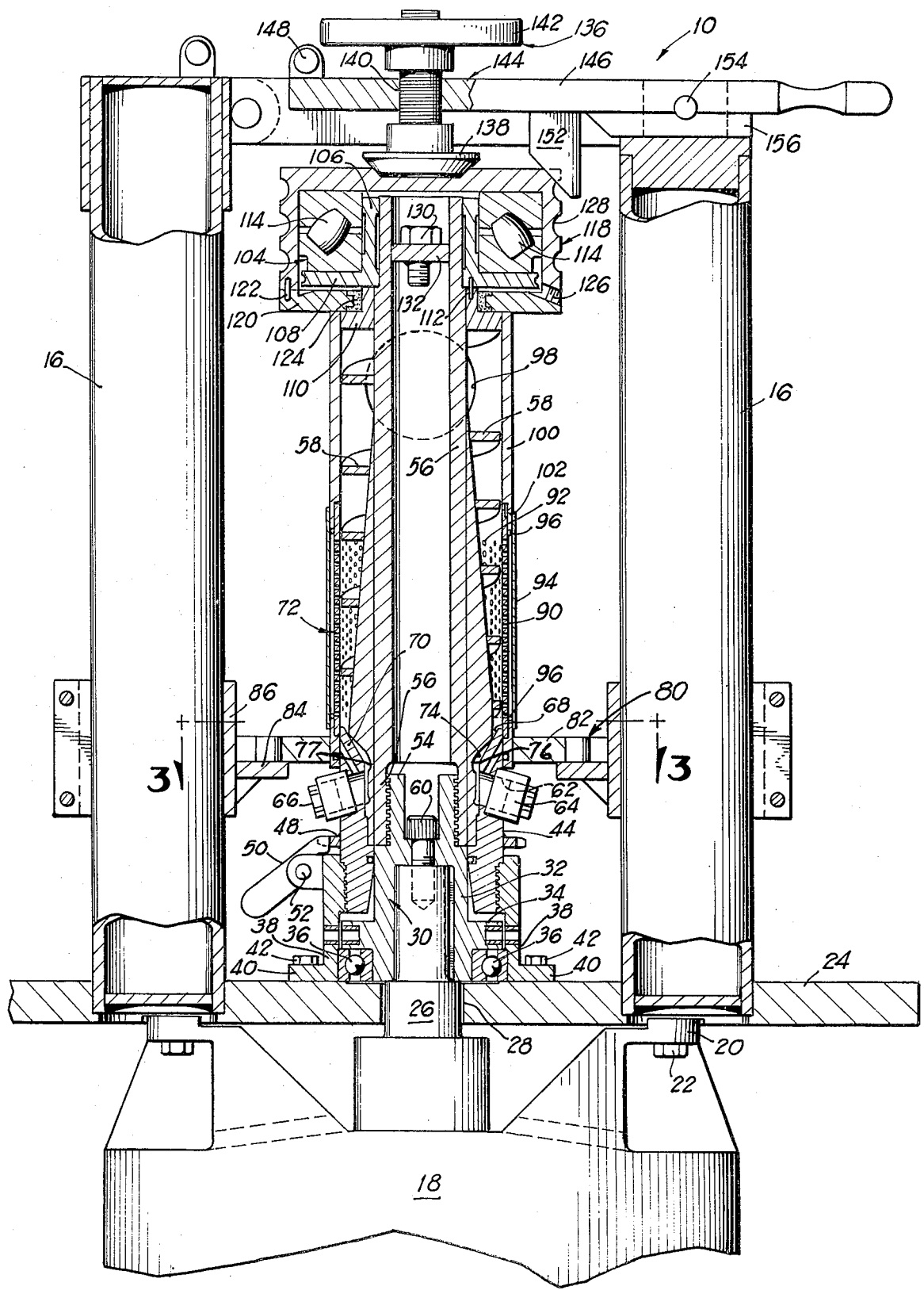
FIG. 2 is a cross-sectional view taken substantially medially, vertically through the machine shown in FIG. 1.
Figure 3:
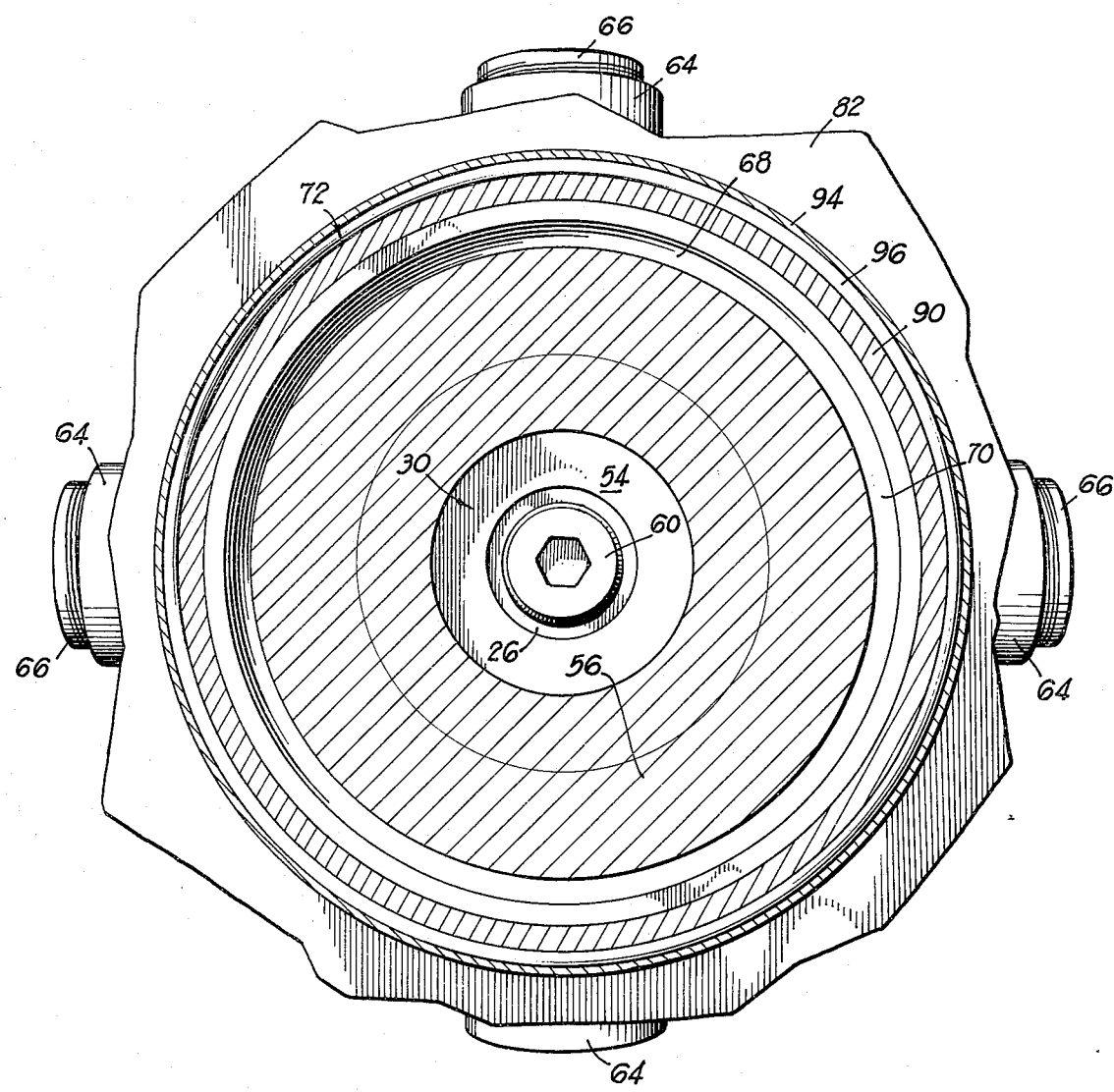
FIG. 3 is a cross-sectional view taken substantially along lines 3—3 in FIG. 2.

The machine 10 is mounted on a floor support base 12 by means of adjustment screws 14 attached to vertical column 16 defining a lower space in which is mounted a large electrical motor 18 held in place by a motor support 20 having motor support bolts 22 attached to an intermediate base plate 24. The motor shaft 26 projects through an opening 28 in base plate 24 and into the inside of a motor shaft adapter 30 which comprises a collar 32 having a flange 34 which rests on top of and inside a radial bearing assembly 36 mounted on top of the base plate 24. A circular bearing retainer 38 having base flange 40 bolted by bolts 42 to the base plate 24 is mounted over the radial bearing assembly 36 to hold same in place.

The interior of the collar of bearing retainer 38 is threaded to receive the external threaded portion of a compression ring 44.

Compression ring 44 is a collar with a projecting flange thereon which is engaged by a compression ring latch 48 comprising a latch member 50 mounted on a latch pin 52 to be moved from latching to unlatching position on the compression ring latch 48.

Motor shaft adapter 30 has a threaded upper collar 54 which is externally threaded to receive the internal threads of the auger blades 58 in spiral formation. A cap screw 60 extends through the internal bore of the threaded upper collar 54 and into the end of the motor shaft 26.

Compression ring 44 is formed internally with 4 passageways 62 for the continuous self-removal of hard pieces of bone and the like and tubes 64 are connected to the passageways and capped by caps 66 except for whichever bone outlet tube 64 is in use. Therefore, it is possible to select the position of the bone outlet or exit on the machine and to connect a discharge tube or place a container therewith.

The compression ring 44 is also formed with a tapered bore 68 in the upper end thereof with an inclined or slanted edge 70 to be adjusted in engagement with the interior of a stainless steel housing and screen arrangement 72. The exterior of the lower end of the auger 56 is formed with an inclined surface 74 leading to a pair of spaced concave indentations formed by two spiral grooves 76, 77.

A support collar 80 is mounted on the outside of the compression ring 44 and has an external flange 82 mounted on a projecting support flange 84 extending from respective collars 86 mounted on respective vertical posts 16 and being keyed to blocks 88 thereon.

The reduced interior of the ring 80 receives the lower end of the stainless steel screen 90 which is provided with selected screen openings 92 to accommodate the softer meat which is separated from the bone according to well-known principles of design of bone and meat and screen separators which exist in the prior art and is described in various prior patents.

A stainless steel sleeve 94 is mounted around the screen 90 and over upper and lower gaskets or seals 96 which are fitted around the screen 90 for the continuous self-removal of the meat. A product inlet 98 in the form of a 3 inch tube is connected to the product inlet sleeve which has a reduced lower end 102 which is notched to fit over the upper end of the screen 90. The product inlet sleeve 100 is held in place by a combination radial and thrust bearing assembly 104 comprising an inner flanged collar 106 having a flange 108 fitted over the upper end of the auger 56 and resting upon a lower flanged collar member 110 which is fitted around the tapered outside the auger 56. A pin 112 is fitted between flanged collar 106 flange 108 and the top edge of the flange collar 110 and a plurality of bearing members 114 are supported for rotation.

A cap 118 rests on a collar 120 which is on top of the product inlet sleeve 100 and pins 122 connect the bottom edge of the cap to the collar 120 which is sealed in place by a gasket 124. There is a housing drain 126 in the collar 120. Cap 118 is provided with a series of peripheral annular grooves 128 to facilitate removal by hand.

There is a bolt 130 which is threaded into a plate 132 which is welded to the interior of the auger 56 to facilitate the use of a special wrench (not shown) to unscrew the auger.

The entire machine 10 is readily assembled and disassembled and the auger 56 may be removed for cleaning periodically such as the end of each day. After the removal of the cap 118 it is a simple matter to remove the respective following parts beneath the cap such as the inner flanged collar 106, the auger 56, the flange collar 110 and all the other parts in series starting at the top and working to the bottom actually disassembling the complete machine 10, removing the auger 56 and all the other parts for cleaning and replacement.

Cap 118 is held in place by means of an adjustable pressure means 136 comprising a dish-shaped pressure member 138 having a threaded body 140 on which is mounted a removable actuator 142 which is threaded on top of the body 140. Body 140 is threaded through an opening in a locking lever assembly 144 comprising a pair of connected locking levers 146 pivotally mounted on pivots 148 attached to flanges 150 on columns 116. Locking levers 146 carry a locking cam 152 which engages the cap 118 and after pressure engagement the locking levers 146 are held in place by removable pin 154 which is removably held in place on a plate 156 whereby the machine 10 is held in tight assembled relationship during operation and the cap 118 is properly pressured by the pressure member 138 but the machine 10 may be easily disassembled by unscrewing 138, then moving the pin 154, swinging the locking lever assembly 144 into upward position to remove the pressure from engagement with cap 118, removing cap 118 and disassembling the rest of the machine from top to bottom.

The compression ring 44 is adjustable as mentioned previously and will screw up and down thereby closing a gap on either side and all the way around the auger 56 allowing a back pressure action to take place which is where the greatest torque takes place on the auger 56 when auger 56 is under compression. The auger of course is a screw conveyor and the product is introduced through the product inlet 98 which may be a 3 inch pipe and after introduction the blades 58 of the auger moves the product downward assisted by gravity and then a typical arrangement of the diameter of the auger blades 58 start off for example at a diameter of 3 inches and squeeze the product to a blade diameter of 2 inches thereby reducing and squeezing the product from 3 inches to a 2 inch flight between the blade projections finally squeezing the product against the screen 90. In one preferred form there are 5 inches of holes in the screen 90 for a screen that is 7 inches long and the screen 90 is a sleeve which has been drilled to provide the holes in it completely through. When the compression ring 44 is tightened it creates the throating action and being screwed up very tight literally jams the area of the tapered base 68 which is known as the throat area.

Thus, the machine 10 works on the principle of the balance between the product coming in and smaller amount of bone being allowed to go out so that in placing the meat and bone under compression the meat will flow away from the bone out of the holes in the screen 90 and will exit under its own pressure through the meat outlet. The machine actually continuously pumps the meat out in a form that is good usuable meat and continuously pumps the bones out as well. When the bones continue through the throating and gating action and are contained in a relatively small area inside the compression ring 44 and under pressure the bone is continuously self-exited out of the bone outlet 62. In the present machine there are four bone outlets 62 but at any one time only one of the outlets actually is letting the bone out and the other three are capped off. One reason for this is as the compression ring 44 is screwed and tightened back and forth to get the right balance it may be necessary to cause the bone to go to the right, and/or left and to balance the system selecting the particular bone outlet to be used. Prior art machines that operate horizontally have the meat falling through the screen at the bottom and dropping away and the bones falling out at the end but in the present machine because it is vertical it is possible to control the exiting of the meat and the bone by using one selected size of product inlet, a particular size of meat outlet and still another size of bone outlet.

The particular arrangement of the radial bearing assembly 36 at the bottom and the bearing assembly 104 at the top make it possible to use only two sets of bearing as contrasted with some machines which have more than two sets of bearings. In the present machine 10 the top bearing is a combination radial and thrust bearing instead of two separate bearing sets. This allows the machine to have a self-centering feature when it is assembled and locked together. Thus, the present machine 10 vibrates less and is not nearly so noisy as some other machines.

The two spiral grooves 76, 77 function as reverse flights cut into the auger 56 to assist in expelling the bone. Grooves 76, 77 are helical cavities.

While I have shown and described a particular embodiment of the invention and a suggested mode of operation this is by way of illustration and does not constitute any sort of limitation on the scope of the invention because there are various alterations, changes, deviations, eliminations, substitutions, changes and departures which may be made in the particular embodiment shown and described without departing from the scope of this invention as defined in the appended claims.

What is claimed:

1. In a deboning machine for separating mixed particles of bone and meat product such as obtained by grinding fish or chicken bones having meat thereon:
   a machine frame,
   a support base for said frame,
   a motor mounted on said support base,
   a product auger having a first end and an opposed second end, said first end being connected directly to said motor for directing the product toward said motor,
   connecting means on said base connecting said motor directly to said auger,
   said auger being tapered on the outside and comprising auger blades therein for removing meat products and directing same toward said motor,
   support means on the base for supporting said auger for rotation by said motor, said support means comprising first bearing means for said auger on said support base,
   a housing mounted on said base and having said auger mounted therein and there being a product space between the inside of said housing and the exterior of said auger near the second end thereof,
   a bone outlet adjacent said first bearing means and in communication with the space between said housing and said auger,
   a sleeve having holes therein mounted over said auger,
   a meat outlet adjacent said first bearing means in communication with said sleeve,
   a product inlet mounted on said machine adjacent said second end of said auger and being in communication with said auger,
   support members supporting said sleeve on said base outside said sleeve,
   second bearing means for the second end of said auger,
   and means on said support members for retaining said second bearing means in position on the second end of said auger.

2. The deboning machine claimed in claim 1:
   comprising a compression ring on said machine and said product space being between the inside of said compression ring and the exterior of said auger,
   said auger having a tapered portion on the surface thereof forming a throat between the interior of said compression ring and the exterior of said auger.

3. The machine claimed in claim 1 wherein said first bearing means comprises a combined radial and thrust bearing.

4. The machine claimed in claim 1 wherein said housing is circular and there are a plurality of meat outlets in communication with said sleeve, said outlets being selectively closed except for one outlet which is in operation.

5. The machine in claim 1 wherein there is a motor shaft on said motor and a motor shaft adapter comprising a collar on said shaft, means attaching said collar to said shaft, external threads on said collar screwed into internal threads within said auger.

6. The device in claim 5 wherein there is a radial bearing assembly and base comprising a bearing support in said adapter for rotation.

7. In a deboning machine for separating mixed particles of bone and meat:
   a machine frame comprising a base and support members on said base,
   a motor support on said base,
   a motor on said motor support,
   a motor shaft normally projecting from said base,
   a bearing retainer and a first bearing assembly on said base and motor shaft,
   a collar attached to said motor shaft and having a threaded portion thereon,
   an elongated auger connected directly to said motor for directing the products toward the motor and having a first end and a second end, said auger comprising a cone and having internal threads threadedly engaging on said collar,
   a second bearing assembly on the second end of said auger,
   an inlet for said mixed particles adjacent said second bearing assembly and leading to said auger for receiving the particles at a position spaced from said motor,
   a compression ring on said first bearing assembly threadedly engaging said first bearing retainer,
   a tapered inlet on said compression ring defining a bone passage with the outside of said auger cone,
   a bone outlet adjacent said first bearing assembly leading to a passageway between the exterior of said auger and said compression ring,
   blade means on said auger comprising blades extending from the second end of said auger to the first end adjacent said bone passage, for moving said bone and meat toward said motor from said inlet,
   a meat outlet adjacent said first bearing means in communication with said auger, whereby the meat is directed from said inlet toward said motor.

8. The deboning machine claimed in claim 7 there being a screen supported on the outside of said auger and said screen having the meat outlet openings therein.

9. The deboning machine claimed in claim 7 wherein said compression ring is formed internally with a plurality of passageways for the removal of hard pieces of bone.

10. The device claimed in claim 9, said compression ring comprising a collar having a projecting flange thereon,
a motor shaft adapter having a threaded collar which is externally threaded to receive the internal threads located on the bottom of said auger.

11. The device claimed in claim 10, said compression ring having external threads thereon threadedly engaging the bearing assembly outside of said motor shaft.

12. In a method of separating meat from a mixture of meat, bone and other materials in a deboning arrangement which receives the mixture delivered to the arrangement and in which there is an auger means located within a partially closed housing, bearing means supporting said auger means, said auger means having a first end and a second end, a motor driving said auger means through a direct connection, a perforated or foraminous screen arrangement located about said auger, an inlet for said mixture spaced from said motor, a restricted opening or throat on the outside of the auger means and the outside of the motor drive, a meat outlet and a bone outlet, the steps comprising:
(a) delivering a mixture containing the meat, bone and other materials from said inlet at a location spaced from said motor into the housing in which there is located the auger means,
(b) moving the mixture in a direction toward the motor while
(c) confining the mixed material within the housing under the action of the auger to create a pressure,
(d) forcing the meat material together with any liquid material from the openings in said screen in a direction toward the motor and the bearing means supporting the auger,
(e) and forcing the bone and other particles under pressure through the restricted opening on the outside of the auger means and around the outside of the bottom of the auger where the motor drive is located.

13. The method in claim 12 including the step of (f) providing a compression means defining said throat.

14. The method claimed in claim 13 including the step of (g) providing an adjustment means for the compression means whereby the throat or opening between the first end of the auger means and the compression means may be adjusted.

15. The method claimed in claim 13 including the step of (g) providing the bottom of said auger means with other than a straight peripheral bottom surface and the compression means with a matching surface which is generally along the direction of the surface of the auger means.

16. The method claimed in claim 15 including the step of (h) directing said bone and other material outwardly from the surface of the first end of the auger means through at least one selected opening leading to the space between the compression means and the auger means.

17. A method of separating meat from bone and other harder substances than meat in a mixture that is delivered to an apparatus which includes a machine frame, a support base for said frame, a motor mounted on said support base, a product auger having a first end and an opposed second end, said first end being connected directly to said motor for directing the product toward said motor, connecting means on said base connecting said motor directly to said auger, said auger being tapered on the outside and comprising auger blades therein for removing meat products and directing same toward said motor, support means on the base for supporting said auger for rotation by said motor, said support means comprising first bearing means for said auger on said support base, a housing mounted on said base and having said auger mounted therein and there being a product space between the inside of said housing and the exterior of said auger near the second end thereof, a bone outlet adjacent said first bearing means and in communication with the space between said housing and said auger, a sleeve having holes therein mounted over said auger, a meat outlet adjacent said first bearing means in communication with said sleeve, a product inlet mounted on said machine adjacent said second end of said auger and being in communication with said auger, support members supporting said sleeve on said base outside said sleeve, second bearing means for the second end of said auger, and means on said support member for retaining said second bearing means in position on the second end of said auger, the steps comprising:
(a) introducing the mixture at a place spaced from the motor,
(b) directing the bone and other particles toward the motor under pressure through a passageway on the outside of said moving blade means whereby said bone and other material is continuously moved by pressure through said passageway on the outside of said blade means,
(c) applying continuous pressure by the blade means,
(d) forcing the bone and other materials under said continuous pressure to move in the direction toward the motor,
(e) and directing said bone and other materials in a direction radially outwardly from the center of said blade means through a bone outlet.

18. The method claimed in claim 17 including the step of providing several bone outlets located in spaced relationship peripherially of said blade means.

19. The method claimed in claim 18 including the step of attaching said motor directly to the bottom of said auger means thereby closing off the bottom of said blade means from any meat products or bone.

20. The method claimed in claim 19 including supporting said motor on a base and supporting said blade means on a bearing means located on said base.

21. The method claimed in claim 17 including the step of providing an adjustable compression means around the bottom of said auger means to provide and adjust the bone exit passageway between the surface of the blade means and the compression means.

22. The method claimed in claim 21 including the step of providing a plurality of spaced openings on said compression means adjustable therewith and selectively operable to provide the particular selected bone outlet.

23. In a machine for separating mixed bone and meat product such as obtained by grinding fish or chicken bones having meat therein:
a machine frame,
a support base for said frame,
a motor mounted on said support base,
a product auger connected directly to said motor, said auger having a first end and an opposed second end and said first end being connected directly to said motor for directing the product towards said motor, said auger being tapered on the outside and comprising auger blade means thereon for directing meat products toward said motor, first bearing means on the base for supporting said auger for rotation by said motor to move the product towards said motor, a compression ring mounted on said motor and having said auger mounted therein and there being a product space between the inside of said compression ring and the exterior of said auger blade means near the first end thereof, said compression ring being adjustably mounted to increase or decrease the pressure against said auger, said auger having a tapered portion on the surface thereof forming a throat between the interior of said compression ring and the exterior of said auger, a bone outlet adjacent said first end of said auger and in communication with the space between said compression ring and said auger, a sleeve having holes therein mounted over said auger and above said compression ring, a meat outlet adjacent said first bearing means in communication with said sleeve, a product inlet mounted on said machine adjacent said second end of said auger and being in communication with said auger for delivering product toward said motor, second bearing means on the second end of said auger, pressure means on said second bearing means for retaining said auger in assembled position, and support means for said pressure means.

* * * * *